Dec. 18, 1934.   W. R. J. WOOCK   1,984,909
INNER HEATING DEVICE FOR RETREADING MOLDS
Filed Dec. 8, 1930   2 Sheets-Sheet 1

INVENTOR
W. R. J. Woock
BY
ATTORNEY

Dec. 18, 1934.  W. R. J. WOOCK  1,984,909
INNER HEATING DEVICE FOR RETREADING MOLDS
Filed Dec. 8, 1930    2 Sheets-Sheet 2
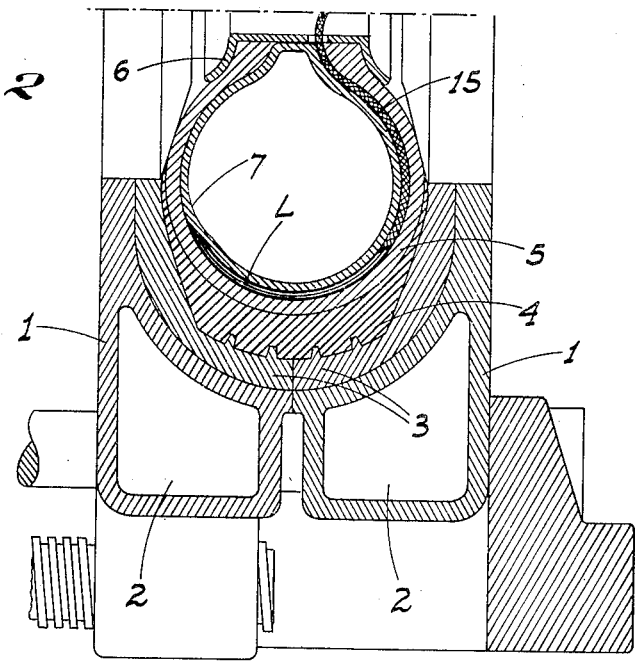
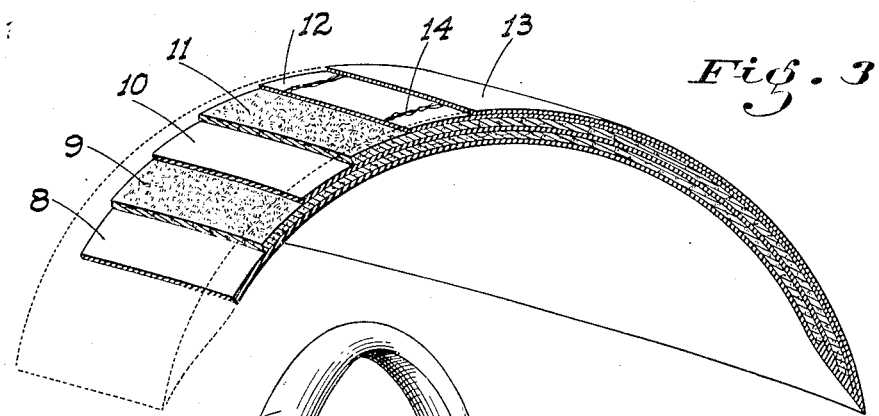
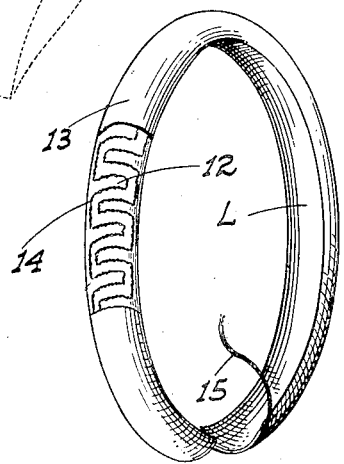
INVENTOR
W. R. J. Woock
BY
ATTORNEY Patented Dec. 18, 1934

1,984,909

UNITED STATES PATENT OFFICE 1,984,909

INNER HEATING DEVICE FOR RETREADING MOLDS

Walter R. J. Woock, Lodi, Calif., assignor to Super Mold Corporation, Lodi, Calif., a corporation of Nevada Application December 8, 1930, Serial No. 500,800

4 Claims. (Cl. 219—46)

This invention relates to the tire retreading industry, and particularly to a means for applying heat to a tire casing from the interior of the same, in addition to that applied to the exterior of the casing, when the tire is in the mold and the new rubber is being vulcanized onto the casing. The present invention is also particularly arranged for use in connection with a mold of the full circle type, such for instance as that shown in Patent No. 1,764,378 to H. J. Woock, dated June 17, 1930, in which the tread for the entire circumferential extent of the tire is vulcanized at one operation.

The desirability of applying heat to the interior of the casing as well as to the exterior of the same is already recognized, but as far as I am aware this has heretofore been done by means of a hot water or other fluid medium in the pressure bag which is placed inside the casing when it is being treated in the mold. This however is an inconvenient and unsatisfactory method, since the amount of heat which can be provided in this manner is entirely inadequate to give the best results without damaging the air bag.

The principal object of my invention is to provide an electric heating device for the interior of the casing which is in the form of a continuous liner, adapted to be interposed between the casing and the air or pressure bag, and which is so arranged that a relatively great heat may be generated and practically all said heat is radiated outwardly or against the casing rather than inwardly or toward the bag. In this manner the entire heat is concentrated where it is needed and economy in current consumption is effected. Also, and what is more important, a better vulcanizing job is had, since the heat is more evenly distributed through the casing, while the time of vulcanizing is reduced considerably over what was previously necessary.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is an enlarged cross-section of the mold and casing, as on the line 2—2 of Fig. 1.

Fig. 3 is an enlarged fragmentary perspective view of the heating liner showing the laminated construction of the same.

Fig. 4 is a perspective view of the complete liner, the outer covering sheet being partly broken away to show the heat element.

Figure 1:
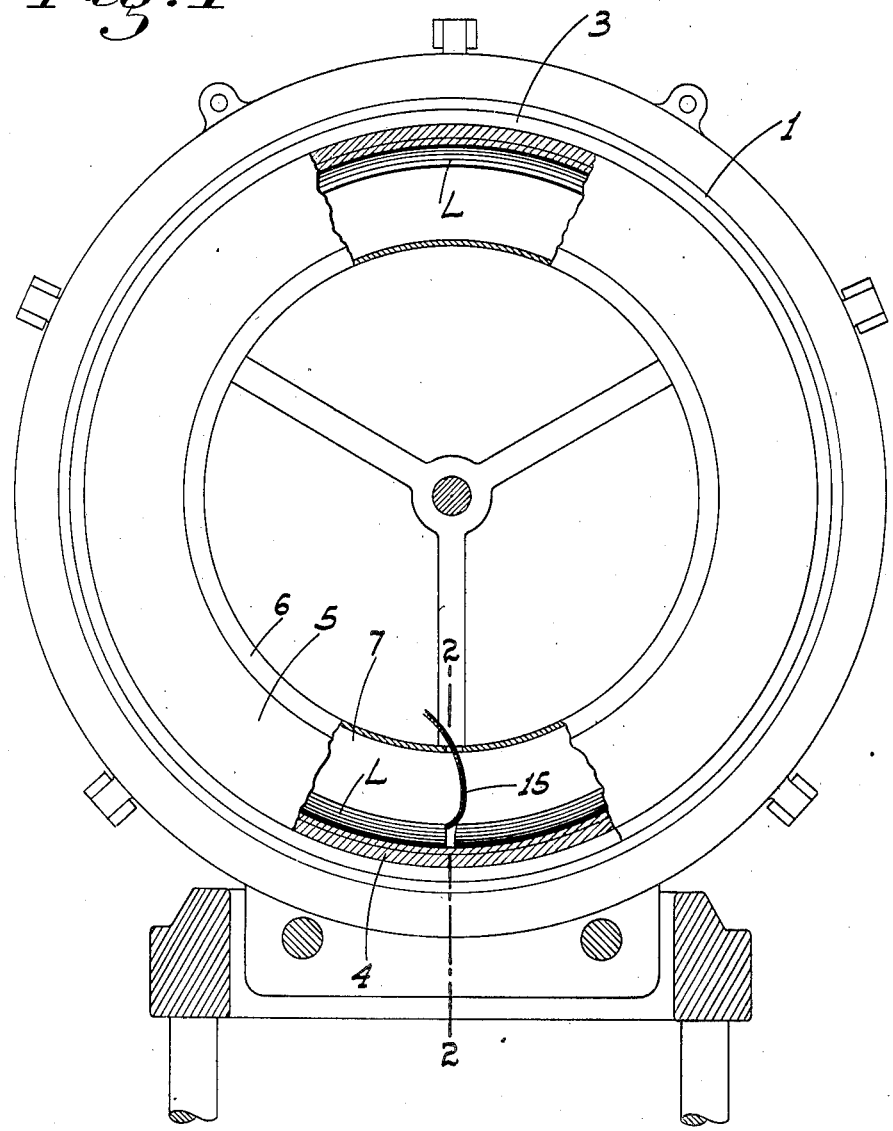
Fig. 1 is a front elevation of a mold section showing a tire casing in place therein, the tire being partly broken out to show the interior heating liner.

Referring now more particularly to the characters of reference on the drawings, the mold structure comprises cooperating circular annular mold sections 1, provided with steam chambers 2 extending above and with matrix sections 3 to engage the tread 4 of the tire casing 5 being retreaded. The casing is mounted on a suitable rim 6 and in the interior is a continuous air tube or bag 7 in which a certain air pressure is maintained during the vulcanizing operations, as is customary.

My new heating liner L, by means of which heat is imparted to the interior casing in the zone of the tread, is disposed between the bag and the casing, being of course placed in the casing before the bag is arranged in position therein. The liner extends for the full circumferential extent of the interior of the casing inwardly of the tread, but its ends are separated and the liner is also curved transversely so as to follow the corresponding curvature of the casing. The liner is in effect a unitary one-piece member initially formed of a number of separate laminations of various material which are preferably arranged as follows:

The inner face of the liner or that which lies against the bag is a thin sheet 8 of relatively pure and flexible rubber. This sheet is followed in order by a layer of cork and rubber composition sheeting 9, a sheet of rubber 10 the same as the sheet 8, another sheet 11 the same as the sheet 9, another sheet of rubber 12, and a final outer surface sheet of rubber 13, the sheets 12 and 13 being the same nature as the sheet 8. Between the sheets 12 and 13 the heating element is disposed. This element is a multiple strand wire 14 of long pitch and flat spiral form, as in my copending application for patent, Serial No. 431,288, filed February 25, 1930. This wire extends from one end of the liner to the other and back again in the form of parallel and oppositely arranged or zig-zag loops, as shown in Fig. 4. This arrangement causes the heat generated by the element to be distributed substantially evenly over the entire surface of the liner and brings both terminals of the element to the same end of the liner where they may be easily connected to a suitable double-wire extension cord 15. The cork sheets terminate short of the side edges and ends of the liner so that they are enclosed by the rubber sheets throughout and are nowhere exposed. In the manufacture of the liner the sheets are all assembled in connection with the heating element as above outlined and are then subjected to heat so that all said sheets are vulcanized together to form a unitary and practically one-piece article. The cork sheeting imparts a certain rigidity to the liner, enabling the same to retain its desired form. In addition, and what is more important, said sheeting forms a heat insulating means which prevents the heat generated by the element from radiating inwardly from the liner to any extent so that no possible damage can be done to the air-bag by the heat; and all the heat is concentrated where it is most needed, or at the outer surface of the liner. The cork sheeting being enclosed in the rubber sheets, not only are the cork particles firmly knitted together when the liner is vulcanized, but such particles are prevented from the relatively rapid disintegration which would be had if they were exposed. The thin rubber sheets coming together at the edges of the liner beyond the termination of the relatively thick cork sheets, and forming an enclosing envelope for the various parts enables the liner to be made so as to have feather edges, avoiding right angled corners or edges which would necessitate a detrimental and sharp bending of the bag where it engages the side edges of the liner.

The liner and pressure bag both being universally flexible, inflation of the bag will cause the liner to be pressed firmly and evenly over its entire area against the casing, thus insuring proper transferring of the heat from the liner to the casing.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An electric heating device comprising initially separate surface sheets of rubber, a sheet of heat insulating material disposed between the rubber sheets, another rubber sheet between the insulating sheet and the adjacent outer sheet, and a heating element disposed between said other and adjacent outer rubber sheets; all said rubber sheets being vulcanized together to form a non-separable unit.

2. An inner heating device for full circle vulcanizing molds comprising a pad in the form of a complete annulus cut through at one point, such pad being adapted to be interposed between an inner tube and tire casing about the entire inner periphery of the tread portion of the latter and which pad comprises essentially a body of flexible rubber, heating elements embedded in the rubber near the outer surface of the pad, and heat insulating material embedded in the rubber between the heating elements and the inner surface of the pad.

3. An inner heating device for full circle vulcanizing molds comprising a pad in the form of a complete annulus cut through at one point, such pad being adapted to be interposed between an inner tube and tire casing about the entire inner periphery of the tread portion of the latter and which pad comprises essentially a body of flexible rubber, heating elements embedded in the rubber near the outer surface of the pad, and heat insulating material embedded in the rubber between the heating elements and the inner surface of the pad, the pad being substantially semicircular in cross section and having its sides tapering to feather edges.

4. In a unitary full circle electric heating unit the combination of initially separate surface sheets of rubber, an electric heating element disposed between said sheets of rubber, and a sheet of heat insulating material disposed between the electric heating electric heating element and that surface sheet of rubber which comprises the inner face of the circular unit whereby when the heating unit is placed between a pressure bag and a tire casing the heat from the heating unit will only radiate outwardly.

WALTER R. J. WOOCK.